United States Patent [19]

Short et al.

[11] Patent Number: 5,031,173
[45] Date of Patent: Jul. 9, 1991

[54] DECODER FOR ADDED ASYNCHRONOUS BIT SEQUENCES

[75] Inventors: Robert T. Short, Salt Lake City; Craig K. Rushforth, Kaysville; Zhenhua Xie, Salt Lake City, all of Utah

[73] Assignee: Unisys Corporation, Blue Bell, Pa.

[21] Appl. No.: 394,027

[22] Filed: Aug. 15, 1989

[51] Int. Cl.$^5$ .............................................. H04J 13/00
[52] U.S. Cl. .......................................... 370/18; 375/1; 375/115; 375/96; 375/39; 445/101
[58] Field of Search .................... 370/18; 375/115, 96, 375/39, 1; 445/101

[56] References Cited

U.S. PATENT DOCUMENTS

| | | | |
|---|---|---|---|
| 4,455,665 | 6/1984 | Kromer, III | 375/96 |
| 4,475,186 | 10/1984 | Gutleber | 370/18 |
| 4,651,327 | 3/1987 | Fujita | 375/1 |
| 4,791,653 | 12/1988 | McFarland et al. | 375/115 |
| 4,805,189 | 2/1989 | Mahoney | 375/96 |
| 4,882,737 | 11/1989 | Dzung | 375/96 |
| 4,908,836 | 3/1990 | Rushforth et al. | 370/18 |

FOREIGN PATENT DOCUMENTS 0313019  4/1989  European Pat. Off. ............. 370/18

Primary Examiner—Douglas W. Olms
Assistant Examiner—Dang Ton
Attorney, Agent, or Firm—Charles J. Fassbender; Mark T. Starr

[57] ABSTRACT

A composite signal is formed by simultaneously transmitting multiple asynchronous data bit sequences, that are coded with respective spreading codes, in a single channel; and a circuit is provided which decodes any bit b(x) in that composite signal. This circuit includes a set of filters which are matched to all of the spreading codes and which obtain (a) a matched filter output signal y(x) for the x-th data bit b(x) and (b) matched filter output signals y(x+1) thru y(x+k-1) for the k-1 data bits that immediately follow data bit b(x); K is the number of bit sequences in the composite signal. An arithmetic unit combines the matched filter output signals via the expression:

$$y(x) - \sum_{i=1}^{K-1} [\text{SIGN } y(x+i)]H(x,x+i) - \sum_{i=1}^{K-1} [ESTb(x-i)]H(x,x-i)$$

where H(x,x±i) is the cross correlation of the spreading codes for data bits b(x) and b(x±i) over the time period that those data bits overlap (and thus add) in the composite signal, and ESTb(x−i) is an estimate of data bit b(x−i) which precedes bit b(x). An output unit decodes the data bit b(x) as a "1" if the above expression is positive, and as a "0" if the above expression is negative. In one embodiment, ESTb(x−i) is the SIGN of a matched filter output y(x−i) for data bit b(x−i). In another embodiment, ESTb(x−i) is the result from the output unit which decoded data bit b(x−i).

10 Claims, 4 Drawing Sheets

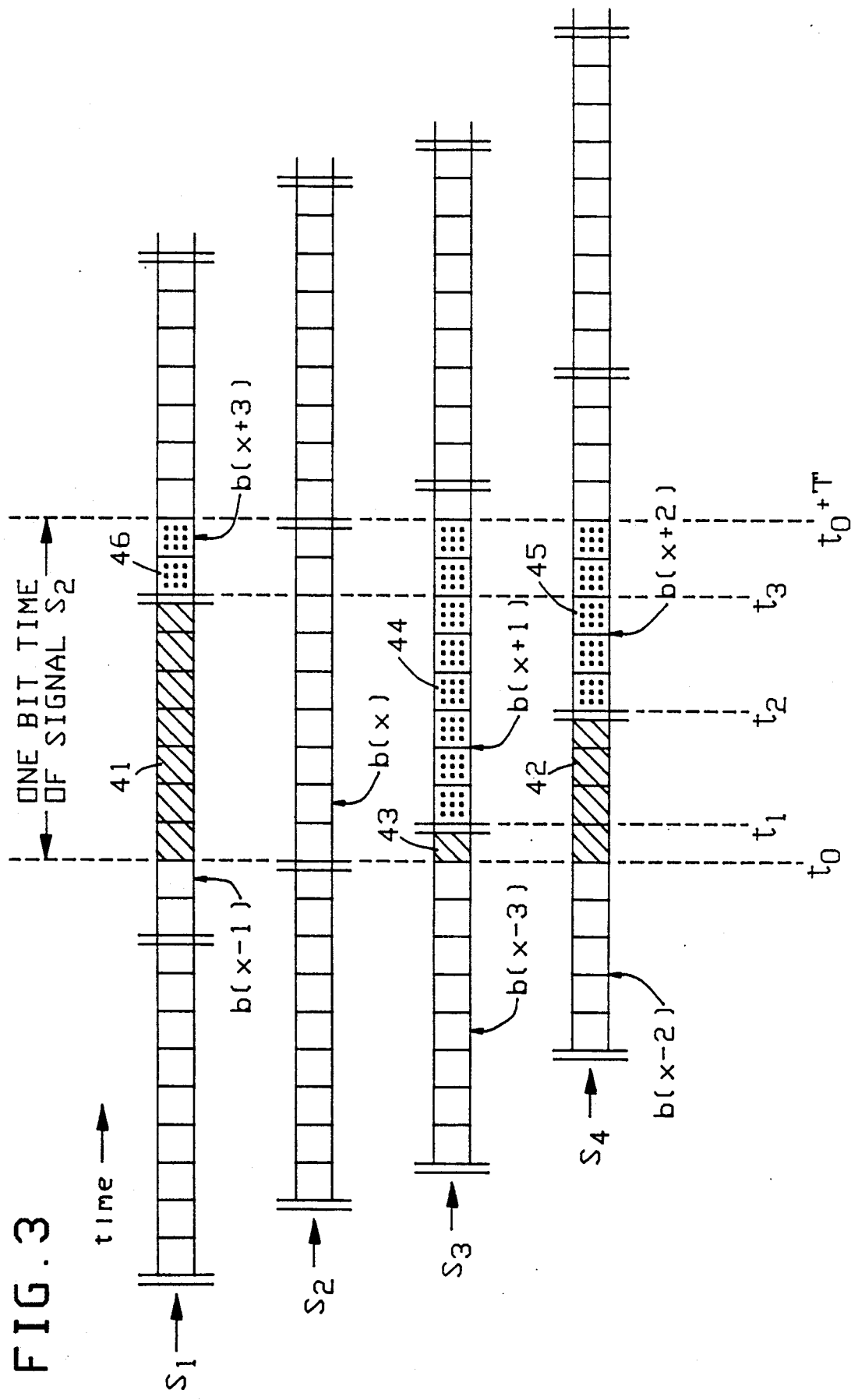

50 → $a_1 b(x-1)$

51 → $\dot{\lambda} = \int_{t_0}^{t_3} a_1 a_2 b(x-1) dt$

52 → $\dot{\lambda} = b(x-1) \int_{t_0}^{t_3} a_1 a_2 dt$

53 → $\dot{\lambda} = b(x-1) H(x, x-1)$

54 → $I = b(x-1)H(x,x-1)+b(x-2)H(x,x-2)+b(x-3)H(x,x-3)$
$+b(x+1)H(x,x+1)+b(x+2)H(x,x+2)+b(x+3)H(x,x+3)$

55 → $I_e = \{\text{sign } y(x-1)\}H(x,x-1)+\{\text{sign } y(x-2)\}H(x,x-2)+\{\text{sign } y(x-3)\}H(x,x-3)$
$+\{\text{sign } y(x+1)\}H(x,x+1)+\{\text{sign } y(x+2)\}H(x,x+2)+\{\text{sign } y(x+3)\}H(x,x+3)$

DECODER FOR ADDED ASYNCHRONOUS BIT SEQUENCES

BACKGROUND OF THE INVENTION

This invention relates to communication systems; and more particularly, it relates to systems in which multiple asynchronous bit sequences are transmitted simultaneously in a single channel.

Conventional communication systems have included multiple transmitting stations which send respective bit sequences to a single receiving station at the same time. But to do that, the conventional communication systems use a separate channel for each bit sequence that is being transmitted. Typically, each channel consists of a certain band of frequencies. Thus, the number of frequency bands that are needed by the conventional communication system increases as the number of bit sequences which simultaneously sent increases. This then presents the problem of requiring a frequency spectrum which is too large.

Accordingly, a primary object of the invention is to provide a communication system in which multiple transmitting stations can send respective bit sequences to a receiving station simultaneously over a single channel.

BRIEF SUMMARY OF THE INVENTION

With the present invention, a composite signal is formed by simultaneously transmitting multiple asynchronous data bit sequences, that are coded with respective spreading codes, in a single channel; and a circuit is provided which decodes any bit $b(x)$ in that composite signal. This circuit includes a set of filters which are matched to all of the spreading codes and which obtain (a) a matched filter output signal $y(x)$ for the data bit $b(x)$ and (b) matched filter output signals $y(x+1)$ thru $y(x+K-1)$ for the $K-1$ data bits that immediately follow data bit $b(x)$, where K is the number of bit sequences in the composite signal. Also included is an arithmetic unit which combines the matched filter output signals via the expression:

$$y(x) - \sum_{i=1}^{K-1} [\text{SIGN } y(x+i)]H(x,x+i) - \sum_{i=1}^{K-1} [ESTb(x-i)]H(x,x-i)$$

where $H(x,x\pm i)$ is the cross correlation of the spreading codes for data bits $b(x)$ and $b(x\pm i)$ over the time period that those data bits overlap and thus add in said composite signal, and $ESTb(x-i)$ is an estimate of data bit $b(x-i)$ which precedes bit $b(x)$. Further included is an output unit which decodes the data bit $b(x)$ as a "1" if the above expression is positive, and as a "0" if the above expression is negative.

In one embodiment, $ESTb(x-i)$ is the SIGN of a matched filter output $y(x-i)$ for data bit $b(x-i)$. In another embodiment, $ESTb(x-i)$ is the result from the output unit which decoded data bit $b(x-i)$.

BRIEF DESCRIPTION OF THE DRAWINGS

Various features and advantages of the invention are described herein in conjunction with the accompanying drawings wherein:

FIG. 3 illustrates the manner in which the multiple bit sequences overlap and interfere with each other as they are sent in the single channel.

DETAILED DESCRIPTION OF THE INVENTION

Figure 1:
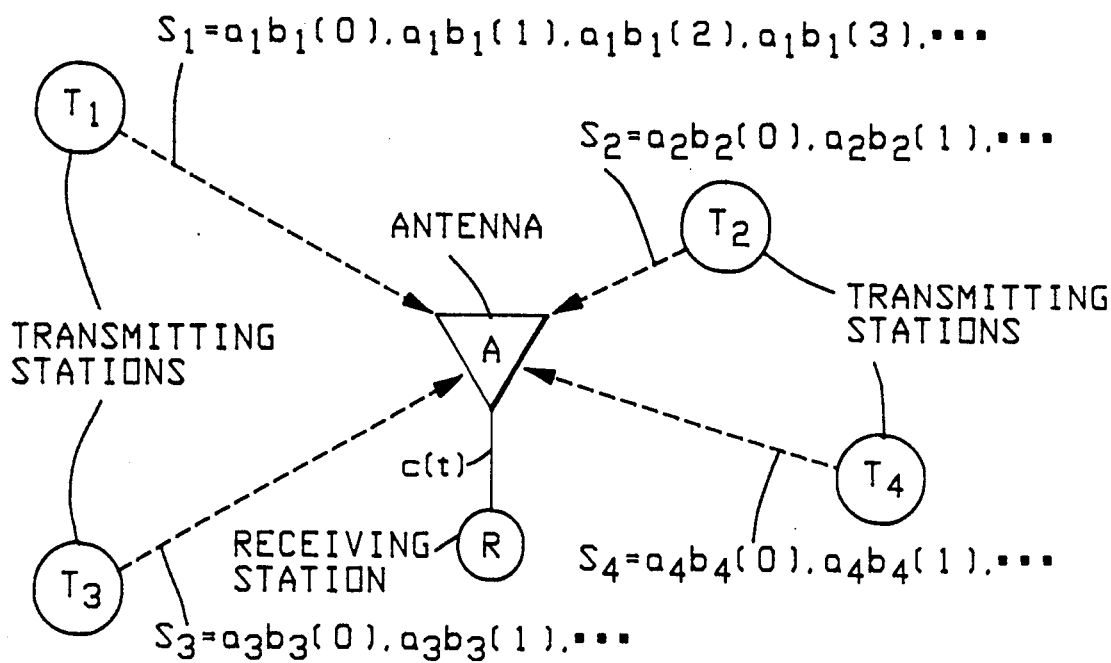
FIG. 1 illustrates a communication system in which multiple transmitting stations send respective messages simultaneously to a receiving station simultaneously in a single channel.

Referring now to FIG. 1, it shows a communication system in which the invention is used. In this system, there are four transmitting stations T1, T2, T3 and T4, and one receiving station R. Station T1 transmits a signal S1 which is an encoded sequence of data bits $a1b1(0)$, $a1b1(1)$, $a1b1(2)$, etc. Symbol $b1(n)$ represents the nth unencoded bit $(n=0,1,2,...)$; symbol $a1$ represents a spreading code which is unique to the station T1; and symbol $a1b1(n)$ represents their product. Similarly, station T2 transmits a signal S2 that is an encoded sequence of data bits in which each bit is multiplied by a second spreading code $a2$; station T3 transmits a signal S3 that is an encoded sequence of data bits in which each bit is multiplied by a third spreading code $a3$; and station S4 transmits a signal S4 that is an encoded sequence of data bits in which each bit is multiplied by a fourth spreading code $a4$.

All of these signal sequences S1, S2, S3, and S4 are transmitted simultaneously and asynchronously (i.e., out of phase) with respect to each other. Signal S1 leads signal S2; signal S2 leads signal S3; and signal S3 leads signal S4. Also, the signals S1-S4 are all transmitted on the same channel. There they form a composite signal $C(T)$ which is the sum of the out-of-phase encoded bit sequences. This composite signal $C(T)$ is detected by an antenna A at the receiving station R. Connected to the antenna, within station R, is a decoder circuit which is constructed according to the invention and which decodes the encoded bits that have been added together in the composite signal $C(T)$.

Figure 2A:
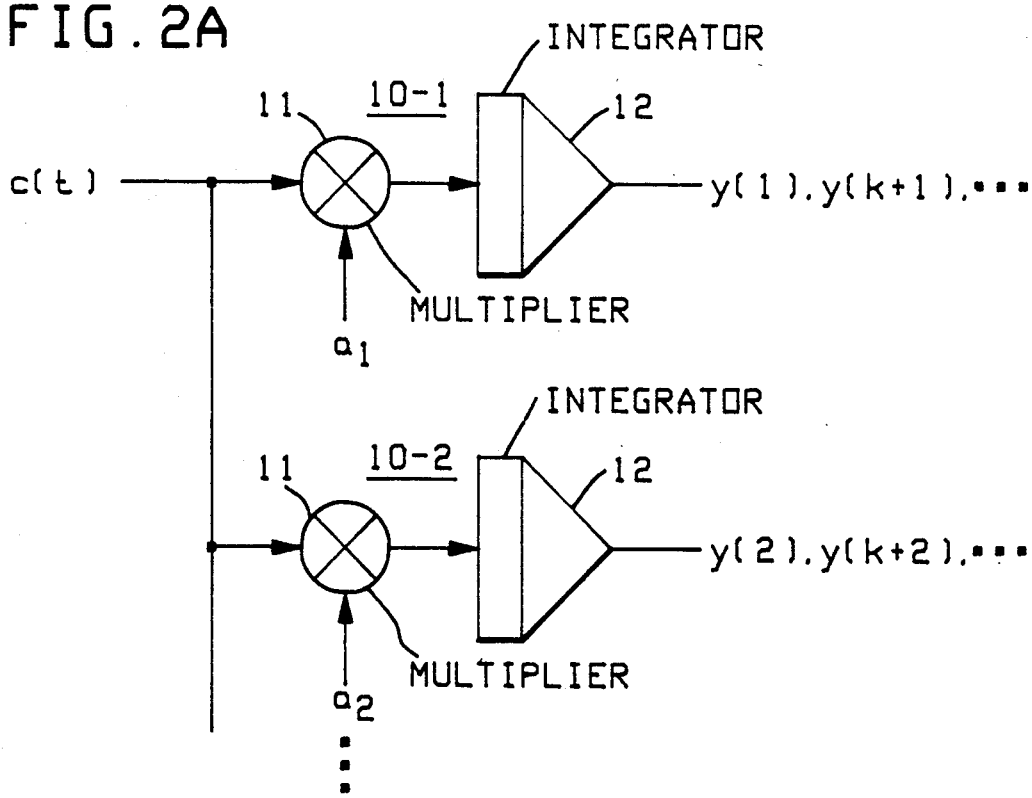
FIGS. 2A and 2B illustrate the details of a circuit in the receiving station which recovers the respective bit sequences after they have been simultaneously sent in the single channel.
Figure 2B:
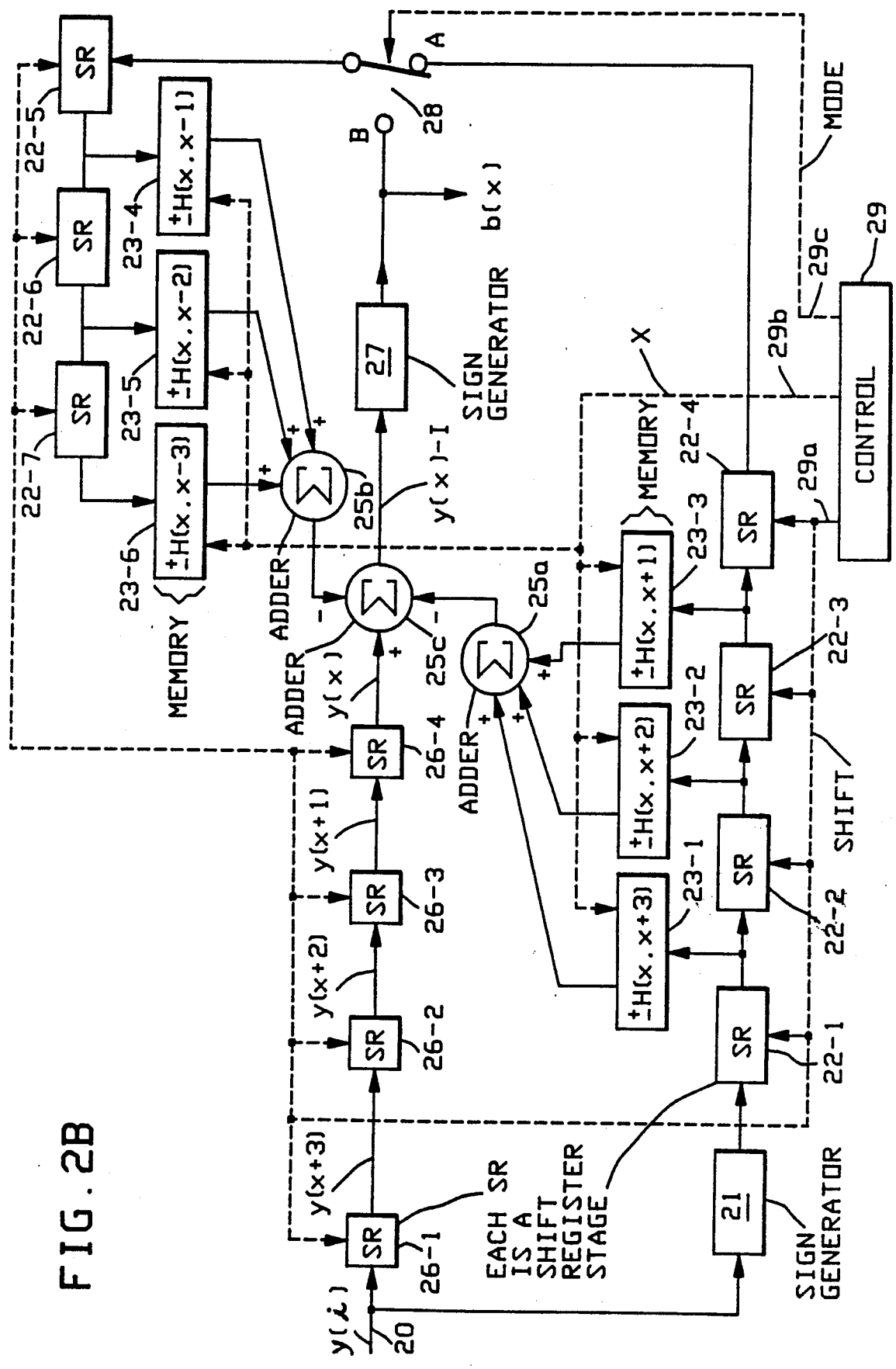

A preferred embodiment of the decoder circuit is shown in FIGS. 2A and 2B. This circuit has an input section, which as FIG. 2A shows, consists of a set of K matched filters 10-1, 10-2, ..., where K is the number of bit sequences in the composite signal. In the FIG. 1 system, K equals 4; and so the receiving station for that system contains four matched filters. Each matched filter consists of a multiplier 11 and an integrator 12 which are interconnected as FIG. 2A illustrates. Filter 10-1 is matched to spreading code $a1$ since one input to its multiplier is the $a1$ spreading code; filter 10-2 is matched to the spreading code $a2$; etc.

Integrator 12 in filter 10-1 is reset at the start of each bit in the sequence S1, and it integrates the remainder of the time. Symbol $y(1)$ indicates the result of this integration at the end of bit $b1(0)$ in the composite signal; symbol $y(K+1)$ indicates the result of this integration at the end of bit $b1(1)$ in the composite signal; etc. Similarly, integrator 12 in filter 10-2 is reset at the start of each bit in sequence S2; symbol $y(2)$ indicates the filter's output at the end of bit $b2(0)$ in the composite signal; and symbol y(K+2) indicates the filter's output at the end of bit b2(1) in the composite signal.

All of the matched filter outputs are sequentially sent in the order in which they are generated (i.e., the order y(1), y(2), y(3), . . . ) to a serial input 20 of the FIG. 2B circuit. There, the matched filter output signals are combined such that they generate a signal z(x) which equals:

$$z(x) = y(x) - \sum_{i=1}^{K-1} [SIGN\, y(x+1)]H(x,x+i) -$$

$$\sum_{i=1}^{K-1} [SIGN\, y(x-1)]H(x,x-i)$$

In the above equation, the term $H(x,x\pm i)$ is the cross correlation of the spreading codes for bits b(x) and b(x±i) over the time period that those bits are added in the composite signal C(T). After signal z(x) is formed, its sign is taken; and data bit b(x) is decoded as a "1" if the sign is positive, and as a "0" if the sign is negative.

To perform the above functions, the FIG. 2B circuit includes a sign generator 21, a serial shift register 22 having successive stages 22-1 thru 22-7, a set of memories 23-1 thru 23-6, a set of adders 25a thru 25c, another shift register 26 having successive stages 26-1 thru 26-4, another sign generator 27, a 2X1 switch 28, and a control circuit 29. All of these components are interconnected to each other as FIG. 2B illustrates.

In operation, the matched filter output signals are sequentially sent to the sign generator 21. It generates a "1" output signal if the sign of the matched filter signal that it receives is positive; otherwise it generates a "0" output signal. That output signal is then shifted through the stages of shift register 22. Stage 22-4 holds a bit which indicates the sign of the matched filter output signal y(x); stages 22-1 thru 22-3 hold bits which indicate the signs of the K−1 matched filter output signals that immediately follow signal y(x); and stages 22-5 thru 22-7 hold bits which indicate the sign of the K-1 matched filter output signals that immediately precede signal y(x).

Each of the memories 23-1 thru 23-6 has address inputs, one bit of which is connected to a respective stage of shift register 22. Those memories have the remainder of their address inputs coupled to receive a signal from controller 29 which indicates the state of the variable x. Memories 23-1 thru 23-6 store the positive and negative values of the cross correlations of the spreading codes as shown in FIG. 2B; and those cross correlations are selectively read from the memories in response to the address inputs. For example, suppose x is 20 and the signs indicated by stages 22-1, 22-2, and 22-3 respectively are −,+,−. Then, the output from memory 23-1 is −H(20,23); the output from memory 23-2 is +H(20,22); and the output from memory 22-3 is −H(20,21).

All of the outputs from the memories 23-1 thru 23-3 are added via adder 25a; and that forms the middle term of the z(x) signal. Similarly, all of the outputs from the memories 23-4 thru 23-6 are added via adder 25b; and that forms the rightmost term of the z(x) signal. Adder 25c then subtracts the output of adders 25a and 25b from y(x); and that generates the z(x) signal. Then, to complete the decode process, circuit 27 takes the sign of the z(x) signal. If that sign is positive, b(x) is a "1"; whereas if that sign is negative, then b(x) is a "0".

After bit b(x) is decoded by the FIG. 2B circuit as described above, the control logic 29 generates a shift pulse on its output 29a. In response, the content of register 22 is shifted to the next consecutive stage, and a bit indicating the sign of the next matched filter output is shifted into stage 22-1. Also, the matched filter outputs in register 26 are shifted to the next consecutive stage so that matched filter output y(x+1) now becomes y(x) in stage 26-4. Control 29a then increments by +1 the x signal on its output 29b. Then, each of the memories 23-1 thru 23-6 reads a new cross correlation value as it is addressed by the new input from shift register 22 and the new value of the x signal. Those cross correlation functions are combined by the adders 25a-25c and circuit 27 to thereby decode the next bit b(x+1).

Considering now FIGS. 3 and 4, the theory on which the FIG. 2 circuit operates will be described. First, beginning with FIG. 3, it shows a portion of the encoded bit sequences S1 thru S4 as they occur in time. All of the signals S1-S4 are out of phase with each other. Consequently, for any particular bit in any particular sequence, that bit is overlapped or interfered with by portions of two encoded bits in each of the remaining bit sequences. For example, consider the encoded bit b(x) in the bit sequence S2. That bit is overlapped, and thus it is interfered with, by portions of the K−1 preceding bits b(x−1), b(x−2), and b(x−3). This interference is indicated by reference numerals 41, 42, and 43. Similarly, bit b(x) is interfered with, by portions of the K−1 following bits b(x+1), b(x+2), and b(x+3). This interference is indicated by reference numerals 44, 45, and 46.

Figure 4:
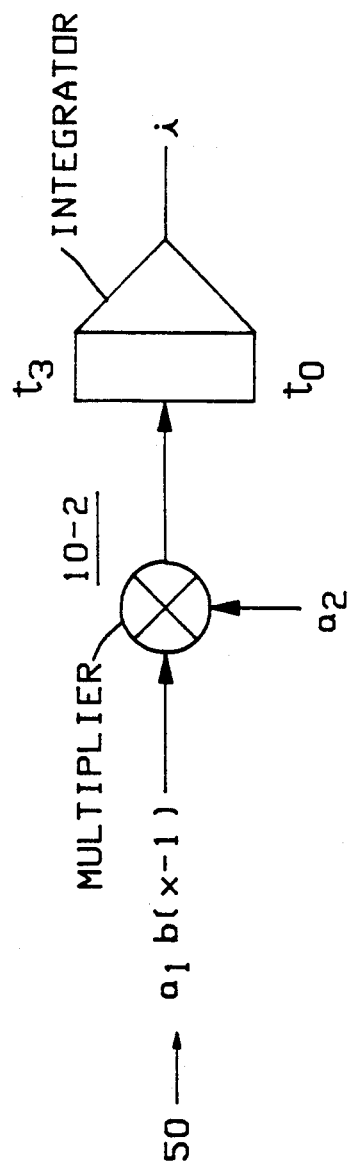
FIG. 4 is a mathematical analysis of the FIG. 3 signals which explains the operation of the circuit in FIGS. 2A and 2B.

Now in the decoding operation which the FIG. 2B circuit performs, the interference terms 41-46 are removed from the composite signal; and, how this occurs is shown in FIG. 4. Item 50 of FIG. 4 shows the operation of the matched filter 10-2 of FIG. 2A during the time interval t0-t3. That is the time interval in which a portion of bit b(x−1) overlaps bit b(x) in the composite signal. Since the composite signal is formed of a sum (i.e., S1+S2+S3+S4), superposition applies. Thus the overlapping portion of bit b(x−1) can be sent separately through the filter 10-2 to determine its effect or interference on the filter's output signal y(x). That interference is indicated by the letter "i".

Item 51 of FIG. 4 gives a mathematical expression for the interference i. In that expression, the term b(x−1) is a constant which has one of two possible values, and thus it can be taken out from behind the integral symbol. This results in item 52 in which what remains behind the integral sign is the product of the two spreading codes a1 and a2 over the time period which those spreading codes overlap. But that time integral is the definition of the cross correlation of the two spreading codes a1 and a2. Thus, the integral of item 52 can be replaced with H(x,x−1) as is done in item 53.

This analysis of items 50-53 can be repeated for each of the interfering terms 41-46 in FIG. 3. And, the result of that analysis is given by item 54 in FIG. 4. There, the expression for "I" gives the total interference on the encoded bit b(x) in the composite signal which is caused by the K−1 encoded bits which immediately precede bit b(x) and the K−1 encoded bits which immediately follow bit b(x).

Actual values of the various bits that are in the expression 54 are unknown in the receiving station R; those bit values are known only by the transmitting stations. Thus, to determine the interference "I", the receiving station makes an estimate of the bit values that are in equation 54. Bit $b(x-1)$ is estimated to be a $+1$ if the sign of the matched filter output $y(x-1)$ is positive; otherwise, bit $b(x-1)$ is set at $-1$. Similarly, bit $b(x-2)$ is estimated to be a $+1$ if the sign of the matched filter output $y(x-2)$ is positive; otherwise, bit $b(x-2)$ is set at $-1$; etc. This is shown by item 55.

Compare now item 54 with circuit 2b. In that circuit, shift register 22 carries the terms sign $y(x-3)$ thru sign $y(x+3)$ which are the estimated bit values; memories 23 carry the autocorrelation terms $H( , )$; and the adders 25a-25c subtract the interference "I" from the matched filter output $y(x)$. The result is sent to the sign generator 27; and there, bit $b(x)$ is decoded as a $+1$ or $-1$ depending upon whether $y(x)-I$ is greater than or less than zero.

A preferred embodiment of the invention has now been described in detail. In addition, however, many changes and modifications can be made to this embodiment without departing from the nature and spirit of the invention. For example, after bit $b(x)$ has been decoded by the circuit of FIG. 2B, that decoded value can be substituted into equation 54 of FIG. 5. By this means, the estimated values for bits $b(x+1)$, $b(x+2)$, and $b(x+3)$ can be the previously decoded values of bit $b(x)$ rather than the sign of the matched filter outputs $y(x+1)$, $y(x+2)$, and $y(x+3)$. To implement this modification, the switch 28 is included in the FIG. 2B circuit. Placing the wiper of switch 28 in position B via the mode signal implements this modification; whereas placing the wiper in position A implements the previously described version of equation 55.

As another modification, the bits of just one bit sequence in the composite signal $C(t)$ can be decoded rather than the bits of all of the bit sequences. In this modification, control circuit 29 in FIG. 2B generates a string of K shift pulses on line 29a instead of just a single shift pulse. At the end of each such string of pulses, stage 26-4 holds $y(x)$, $y(x+K)$, $y(x+2K)$, etc.; and the corresponding bits from sign generator 27 are $b(x)$, $b(x+K)$, $b(x+2K)$, etc. which belong to a single bit sequence. This modification reduces both the decoding time of a bit sequence, and the storage size of the memories 23-1 through 23-7, by a factor of K.

As another modification, any type of signal transmission method may be used to send the encoded bit sequences S1–S4 from the transmitting stations to the receiving stations. For example, the encoded bit sequences can be shifted upward in frequency to a certain channel via AM or FM in the transmitting stations, and shifted back down in frequency in the receiving station.

Accordingly, it is to be understood that the invention is not limited to the above details but is defined by the appended claims.

What is claimed is:

1. A circuit that decodes a data bit $b(x)$ from a composite signal in which K asynchronous bit sequences, that are coded with respective spreading codes, are added together; said circuit being comprised of:

filter means that are matched to all of said spreading codes and obtain (a) a matched filter output signals $y(x)$ for said data bit $b(x)$, (b) matched filter output signals $y(x-1)$ thru $y(x-K+1)$ for the $K-1$ data bits $b(x-1)$ thru $b(x-K+1)$ that immediately precede and partially overlap said data bit $b(x)$ in said composite signal, and (c) matched filter output signals $y(x+1)$ thru $y(x+K-1)$ for the $K-1$ data bits $b(x+1)$ thru $b(x+K-1)$ that immediately follow and partially overlap said data bit $b(x)$ in said composite signal;

combining means for combining said matched filter output signals via the expression:

$$y(x) - \sum_{i=1}^{K-1} [\text{SIGN } y(x + i)]H(x,x + i) -$$

$$\sum_{i=1}^{K-1} [ESTb(x - i)]H(x,x - i)$$

where $H(x,x\pm i)$ is the cross correlation of said spreading codes for bits $b(x)$ and $b(x+i)$ over the time period that those bits are added in said composite signal; and, means for decoding said data bit $b(x)$ as a "1" if said expression is positive, and as a "0" if said expression is negative.

2. A circuit according to claim 1 and further including a control means for directing said combining means to increment the variable x in said expression by factors of K, 2K, 3K, ... such that data bits in only one of said K asynchronous bit sequences are decoded.

3. A circuit according to claim 1 wherein said combining means includes a serial shift register having successive stages which shift from an input to an output, the terms of SIGN $y(x+K-1)$ through SIGN $y(x-K+1)$; and wherein an arithmetic means is coupled to said shift register, for sensing all of said shifted SIGN terms and in response combining all of said cross-correlations $H(x,x\pm i)$ in parallel as specified by said expression.

4. A circuit according to claim 1 wherein said combining means is a specially programmed general purpose digital computer which combines said cross-correlations $H(x,x\pm i)$ of said expression in series.

5. A circuit that decodes a data bit $b(x)$ from a composite signal in which K asynchronous data bit sequences, that are coded with respective spreading codes, are added together; said circuit being comprised of:

filter means that are matched to all of said spreading codes and obtain (a) a matched filter output signal $y(x)$ for data bit $b(x)$ and (b) matched filter output signals $y(x+1)$ thru $y(x+K-1)$ for the K-31 1 data bits $b(x+1)$ thru $b(x+K-i)$ that immediately follow and partially overlap data bit $b(x)$ in said composite signal;

combining means for combining said matched filter output signals via the expression:

$$y(x) - \Sigma \left[ \begin{array}{c} K - 1 \\ SIGN\ y(x + i) \\ i = 1 \end{array} \right] H(x,x + i) -$$

$$\Sigma \left[ \begin{array}{c} K - 1 \\ DEC\ b(x,x - i) \\ i = 1 \end{array} \right] H(x,x - i)$$

where $H(x,x+i)$ is the cross correlation of said spreading codes for data bits $b(x)$ and $b(x+i)$ over the time period that those data bits are added in said composite signal, and DEC $b(x-i)$ is a decode of data bit $b(x-i)$ which procedes bit $b(x)$; and, means for decoding said data bit $b(x)$ as a "1" if said expression is positive, and as a "0" if said expression is negative.

6. A circuit according to claim 5 wherein said combining means includes one serial shift register having successive stages which shift from an input to an output the terms of SIGN y(x+K−1) thru SIGN y(x−1) and another serial shift register having stages which shift from an input to an output the terms DEC b(x−1) thru DEC b(x−K+1); and wherein an arithmetic means is coupled to said shift registers for sensing said shifted SIGN and DEC terms and in response combining all of said cross-correlations H(x,x±i) in parallel as specified by said expression.

7. A circuit according to claim 5 wherein said combining means is a specially programmed general purpose digital computer which combines the cross-correlations H(x,x±i) of said expression in series.

8. A circuit that decodes a data bit b(x) from a composite signal in which K asynchronous data bit sequences, that are coded with respective spreading codes, are added together; said circuit being comprised of:

filter means that are matched to all of said spreading codes and obtain (a) a matched filter output signal y(x) for data bit b(x) and (b) matched filter output signals y(x+1) thru y(x+K−1) for the K−1 data bits b(x+1) thru b(x+K−1) that immediately follow and partially overlap data bit b(x), in said composite signal;

means for combining said matched filter output signals via the expression:

$$y(x) - \sum_{i=1}^{K-1} [SIGN\, y(x+i)]H(x,x+i) - \sum_{i=1}^{K-1} [EST\, b(x-i)]H(x,x-i)$$

where H(x,x±i) is the cross correlation of said spreading codes for data bits b(x) and b(x±i) over the time period that those data bits are added in said composite signal, and EST b(x−i) is an estimate of data bit b(x−i) which precedes bit b(x); and, decoding means for decoding said data bit b(x) as a "1" if said expression is positive, and as a "0" if said expression is negative.

9. A circuit according to claim 8 wherein EST b(x−i) is the SIGN of a matched filter output y(x−i) from said filter means for data bit b(x−i).

10. A circuit according to claim 8 wherein EST b(x−i) is a decode from said decoding means of data bit b(x−i).

* * * * *